(12) United States Patent  (10) Patent No.: US 8,942,770 B2
Kim et al.  (45) Date of Patent: Jan. 27, 2015

(54) MOBILE TERMINAL ADJUSTING BRIGHTNESS DISPLAY AND CORRESPONDING CONTROL METHOD

(75) Inventors: Joungyoul Kim, Seoul (KR); Mansoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 111 days.

(21) Appl. No.: 13/406,183

(22) Filed: Feb. 27, 2012

(65) Prior Publication Data

US 2012/0270606 A1  Oct. 25, 2012

(30) Foreign Application Priority Data

Apr. 21, 2011  (KR) .......................... 10-2011-0037174

(51) Int. Cl.
| | |
|---|---|
| H04M 1/00 | (2006.01) |
| H04M 1/22 | (2006.01) |
| H01M 10/44 | (2006.01) |
| H04M 1/725 | (2006.01) |
| H04W 52/02 | (2009.01) |
| H01M 10/48 | (2006.01) |

(52) U.S. Cl.
CPC .............. *H04M 1/22* (2013.01); *H01M 10/443* (2013.01); *H04M 1/72577* (2013.01); *H04W 52/027* (2013.01); *H04W 52/0277* (2013.01); *H01M 10/44* (2013.01); *H01M 10/48* (2013.01); *H01M 10/486* (2013.01); *H04M 2250/12* (2013.01)

USPC .......................................................... 455/566

(58) Field of Classification Search
USPC ................. 345/101, 102, 204, 690; 455/453, 455/552.1, 553.1, 127.4, 127.5, 127.1, 423, 455/425, 522, 566, 574
See application file for complete search history.

(56) References Cited

U.S. PATENT DOCUMENTS

| | | | |
|---|---|---|---|
| 6,697,953 B1 | 2/2004 | Collins | |
| 7,999,800 B2 * | 8/2011 | Iwabuchi et al. | ............. 345/204 |
| 2005/0146496 A1 * | 7/2005 | Nguyen et al. | ................ 345/102 |
| 2007/0075965 A1 | 4/2007 | Huppi et al. | |
| 2008/0057894 A1 * | 3/2008 | Aleksic et al. | ............. 455/187.1 |
| 2009/0309711 A1 | 12/2009 | Adappa et al. | |
| 2010/0317408 A1 * | 12/2010 | Ferren et al. | ................ 455/566 |
| 2010/0328081 A1 | 12/2010 | Hu et al. | |
| 2010/0330950 A1 * | 12/2010 | Wells et al. | ................ 455/404.1 |
| 2012/0188287 A1 * | 7/2012 | Wurzel et al. | ................ 345/690 |
| 2012/0275350 A1 * | 11/2012 | Kwok | ............................ 370/277 |

* cited by examiner

*Primary Examiner* — Asghar Bilgrami
*Assistant Examiner* — Hung Du
(74) *Attorney, Agent, or Firm* — Birch, Stewart, Kolasch & Birch, LLP

(57) ABSTRACT

A mobile terminal including a wireless communication unit configured to wirelessly communicate using at least two different communication systems; a display unit including a backlight configured to apply light to a display screen of the display unit; a sensing unit configured to measure a temperature of the mobile terminal if the at least two different communication systems are simultaneously used; and a controller configured to adjust a brightness of the backlight based on the measured temperature and a preset temperature.

18 Claims, 10 Drawing Sheets

(a)

(b)

MOBILE TERMINAL ADJUSTING BRIGHTNESS DISPLAY AND CORRESPONDING CONTROL METHOD

Pursuant to 35 U.S.C. §119(a), this application claims the benefit of earlier filing date and right of priority to Korean Application No. 10-2011-0037174, filed on Apr. 21, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof Although the present invention is suitable for a wide scope of applications, it is particularly suitable for adjusting brightness of a backlight in accordance with a communication type.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

Recently, a communication system of a mobile terminal is evolving into the $4^{th}$ generation (4G) system from the $3^{rd}$ generation (3G) system. Owing to the 4G system, a data rate for download or upload is faster than that of the 3G system. However, when the 3G or 4G system is used, since data transmission/reception occurs massively, RF power consumption increases and the temperature of a terminal rises.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a brightness of a backlight can be adjusted in accordance with a communication type.

Another object of the present invention is to provide a mobile terminal and controlling method thereof, by which communication systems of various generations can be simultaneously applied.

A further object of the present invention is to provide a mobile terminal and controlling method thereof, by which power consumption and heat generation speed can be reduced in using both 3G and 4G systems.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal, which uses at least two communication systems, according to an embodiment of the present invention includes a display unit including a backlight to apply light to a screen, a sensing unit configured to measure a temperature of the mobile terminal if the at least two communication systems are simultaneously used, and a controller adjusting a brightness of the backlight in consideration of the measured temperature and a preset temperature.

Preferably, the at least two communication systems include at least two of a $2^{nd}$ generation mobile communication system, a $3^{rd}$ generation mobile communication system and a $4^{th}$ generation mobile communication system.

Preferably, the controller lowers the brightness of the backlight step by step in accordance with the measured temperature.

Preferably, the controller lowers the brightness of the backlight applying the light to a partial region of the screen but maintains the brightness of the backlight applying the light to the screen except the partial region.

Preferably, if a simultaneous use of the at least two communication systems is ended, the controller controls the brightness of the backlight to be restored.

Preferably, the sensing unit periodically measures the temperature of the mobile terminal.

Preferably, the controller checks a power level of the mobile terminal and wherein the controller adjusts the brightness of the backlight in consideration of the power level of the mobile terminal.

Preferably, after the brightness of the backlight has been adjusted, the controller controls the sensing unit to periodically measure the temperature of the mobile terminal More preferably, after the brightness of the backlight has been adjusted, if the temperature of the mobile terminal rises, the controller controls at least one function of the mobile terminal to be ended by priority.

More preferably, after the brightness of the backlight has been adjusted, if the temperature of the mobile terminal rises, the controller controls at least one function of the mobile terminal to be ended in accordance with a user command.

In another aspect of the present invention, a method of controlling a mobile terminal may include the steps of entering a mode of using at least two communication systems simultaneously, measuring a temperature of the mobile terminal, determining whether the measured temperature of the mobile terminal is equal to or higher than a predetermined temperature, and adjusting a brightness of a backlight in accordance with a result of the determining step.

Preferably, the at least two communication systems include at least two of a $2^{nd}$ generation mobile communication system, a $3^{rd}$ generation mobile communication system and a $4^{th}$ generation mobile communication system.

Preferably, the adjusting step includes the step of lowering the brightness of the backlight step by step in accordance with the measured temperature.

Preferably, after the brightness of the backlight is adjusted, the method further includes the steps of, periodically measuring the temperature of the mobile terminal and if the temperature of the mobile terminal rises, ending at least one function of the mobile terminal by priority.

Preferably, after the brightness of the backlight is adjusted, the method further includes the steps of periodically measuring the temperature of the mobile terminal and if the temperature of the mobile terminal rises, ending at least one function of the mobile terminal in accordance with a user command Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
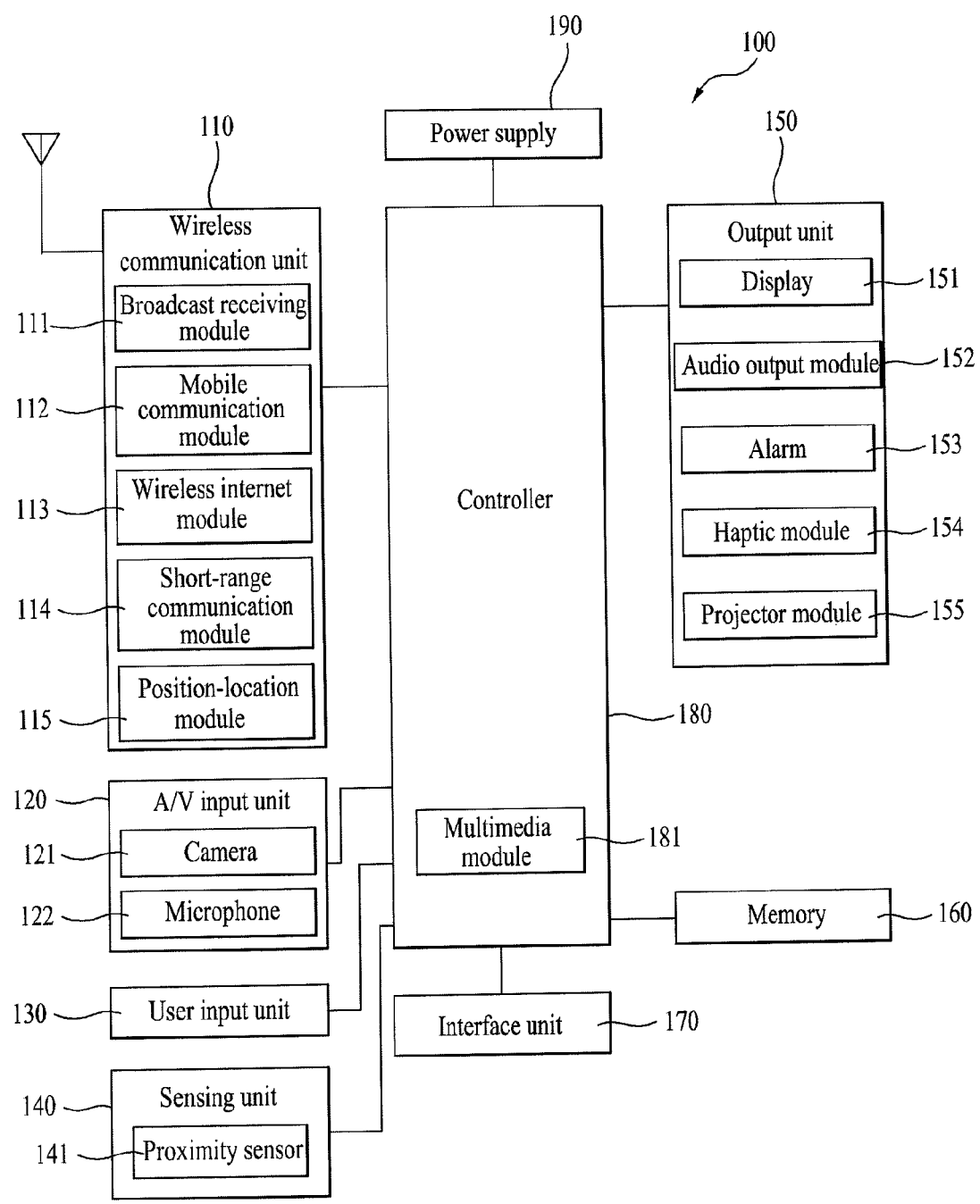
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA(High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (AN) input unit 120 is configured to provide audio or video signal input to the mobile terminal 100. As shown, the AN input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it is able to use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof Various embodiments described herein may be implemented in a computer-readable medium using, for example, computer software, hardware, or some combination thereof For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
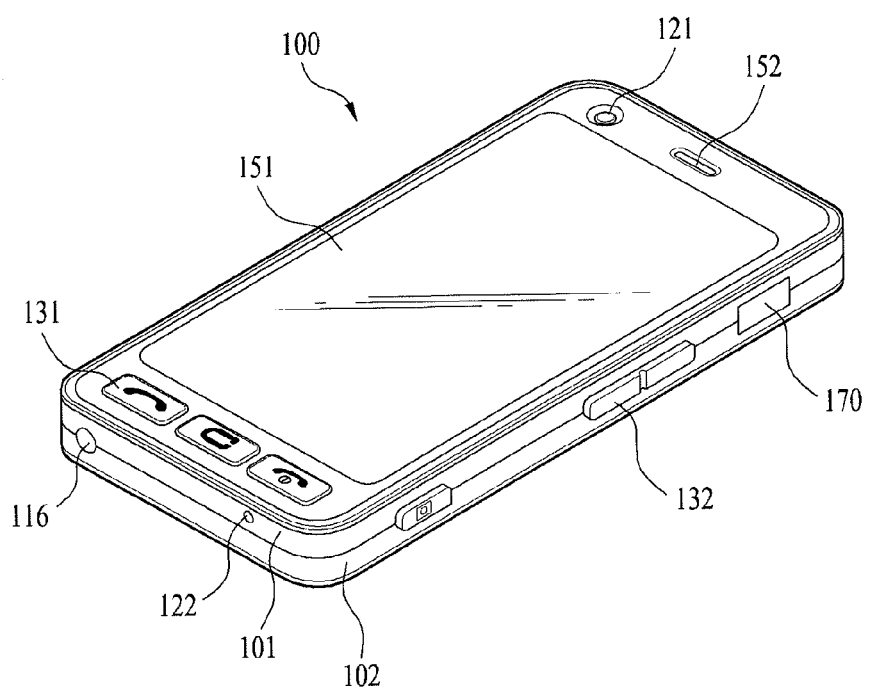
FIG. 2 are perspective diagrams of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 170 and the like can be provided to the terminal body, and more particularly, to the front case 101. An additional component 116 may also be provided (e.g., speaker, external interface, antenna, etc.).

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 3A:
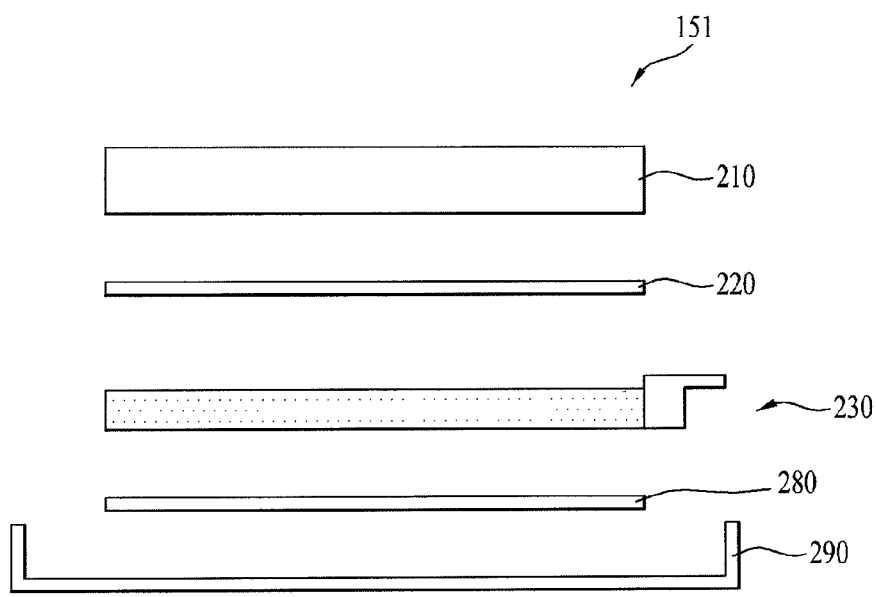
FIGS. 3A to 3C are diagrams to describe a structure of a backlight according to an embodiment of the present invention.

FIG. 3A is a schematic sideview diagram of a display unit 151 according to an embodiment of the present invention.

Referring to FIG. 3A, the display unit 151 may include a liquid crystal display (hereinafter abbreviated LCD) panel 210, a diffuser sheet 220 provided under the LCD panel 210, a backlight unit (hereinafter abbreviated BLU) 230 provided under the diffuser sheet 200 to apply light to the LCD panel 210, a reflector sheet 280 provided under the backlight unit 230 to reflect the light applied from the backlight unit 230, and a frame 290 provided under the reflector sheet 280 to support the above components.

Figure 3B:
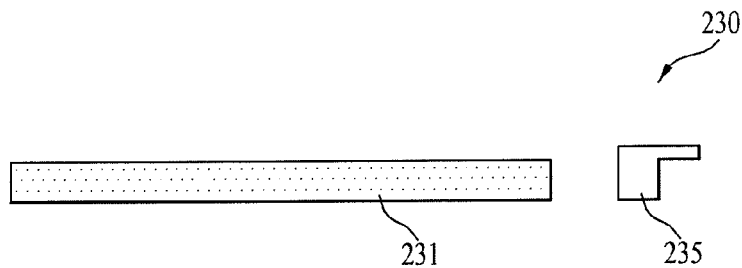
Figure 3C:
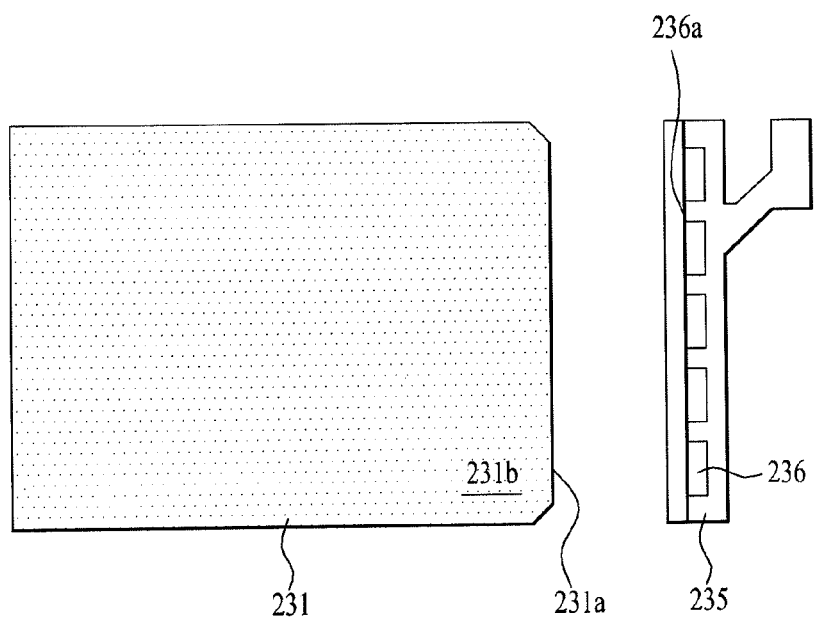

FIG. 3B and FIG. 3C are exploded layouts of a backlight unit 230 according to an embodiment of the present invention. Generally, the backlight unit of the LCD panel 210 can be categorized into a direct type of arranging a light source on a whole backside of the LCD panel 210 and an edge type of arranging a light source on an edge side of the LCD panel 210. The backlight unit according to an embodiment of the present invention relates to an edge type backlight unit frequently used for a mobile terminal to reduce thickness of the display unit 200.

Referring to FIG. 3B and FIG. 3C, the backlight unit 230 according to an embodiment of the present invention may include a light guide plate (hereinafter abbreviated LGP) 231 arranged under the LCD panel 210 and a light source unit support 235 provided to a lateral side of the backlight unit 230 to support a plurality of light source units 236.

Referring to FIG. 3C, the light guide plate 231 may include a light incident surface 231*a*, on which the light provided by the light source unit 236 is incident, and a light emitting surface 231*b*, from which light is emitted to the LCD panel 210. In this instance, the light incident surface 231 and the light emitting surface 231*b* are set perpendicular to each other. In order to for the light guide plate 231 to maintain screen uniformity of the LCD panel 210, a less diffuser is used for a side (i.e., toward the light incident surface 231*a*) closer to the light source unit 236 but a more diffuser is used for a side farther from the light source unit 210, whereby light can be uniformly applied to the screen. Therefore, the light guide plate 231 enables the implementation of a bright and clear image.

Regarding a light emitting process of the backlight unit 230, the light generated from the light source unit (e.g., LED device) 236 is emitted from the light emitting surface 236*a* of the light source unit 236. In doing so, the light is transformed into such a strong beam as R beam, G beam and B beam. The emitted R, G and B beams are then provided to the light incident surface 231*a* of the light guide plate 231.

In the following description, if a terminal uses different communication environments (e.g., when using $2^{nd}$ Generation (2G) or $3^{rd}$ Generation (3G) and $4^{th}$ Generation (4G) simultaneously, when using 2G, 3G and 4G (LTE) simultaneously), or when using any combination of two different communication environments will be referred to as SVLTE (simultaneous voice LTE) mode.

Figure 4A:
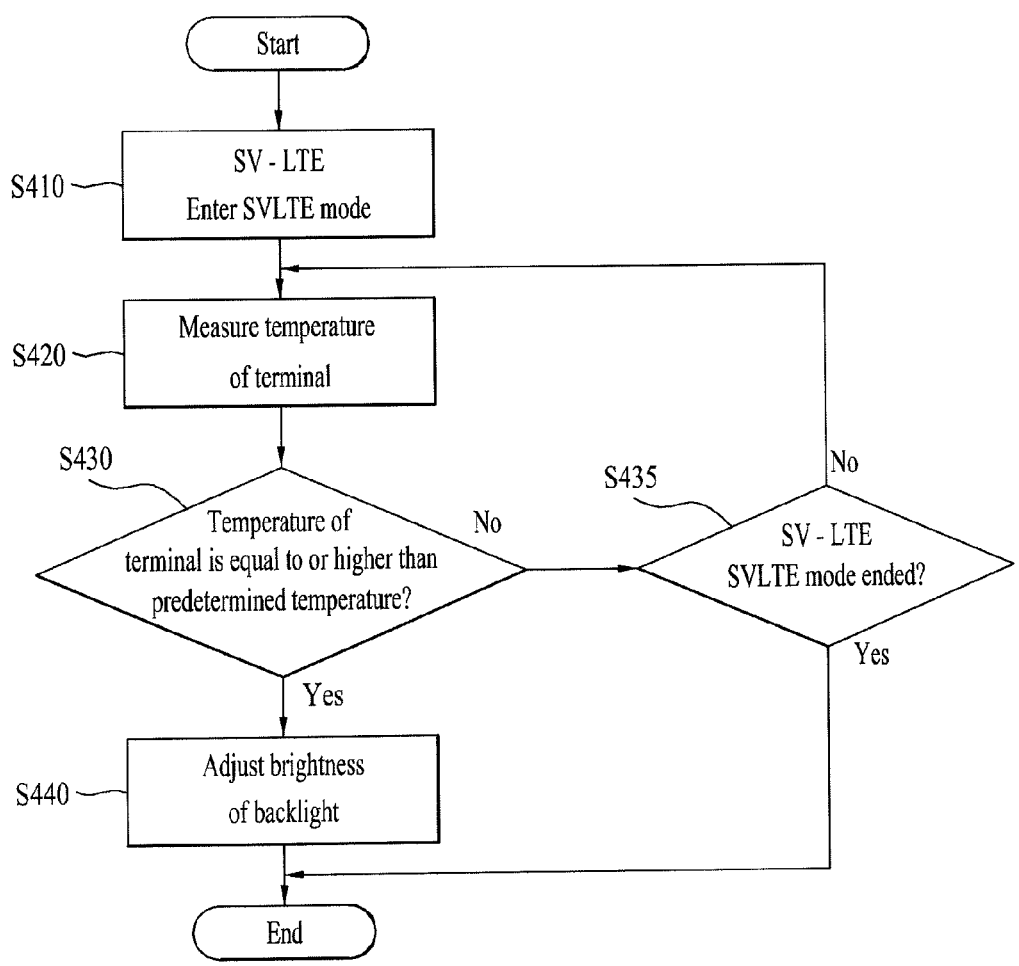
FIG. 4A and FIG. 4B are flowcharts illustrating a method of controlling a mobile terminal according to an embodiment of the present invention.

FIG. 4A is a flowchart illustrating one example of a method of controlling a mobile terminal according to an embodiment of the present invention.

Referring to FIG. 4A, the mobile terminal 100 enters SVLTE mode (S410). The sensing unit 140 measures a temperature of the mobile terminal 100 (S420), and the controller 180 determines whether the temperature of the mobile terminal 100 is equal to or higher than a predetermined temperature (S430). If the controller 180 determines that the temperature of the mobile terminal 100 is equal to or higher than the predetermined temperature (Yes in S430), the controller 180 adjusts the brightness of the backlight (S440). On the contrary, if the controller 180 determines that the temperature of the mobile terminal 100 is not equal to or higher than the predetermined temperature (No in S430), the controller 180 determines whether the SVLTE mode has ended (S435). If the SVLTE mode is not ended (No in S435), the controller 180 controls the temperature of the mobile terminal 100 to be measured again. If the mobile terminal 100 enters the SVLTE mode, the sensing unit 140 of the mobile terminal 100 measures the temperature of the mobile terminal 100. For instance, the sensing unit 140 checks a temperature of RF circuit unit and a temperature of a battery that supplies power to the mobile terminal 100. If at least one of the temperature of the RF circuit unit and the temperature of the battery is equal to or higher than an individually-set reference temperature, the controller 180 performs an operation of lowering the brightness of the backlight down to a prescribed level equal to or lower than a specific brightness. Yet, if both of the temperatures do not exceed the individually-set reference temperatures, respectively, the controller 180 maintains the backlight brightness specified by a user.

If the temperature of the mobile terminal 100 is not equal to or higher than a previously set reference temperature, the controller 180 determines whether the SVLTE mode is ended. If the SVLTE mode is ended (Yes in S435), the controller 180 may not adjust the brightness of the backlight. If the SVLTE mode is not ended, the controller 180 goes back to the step of measuring the temperature of the mobile terminal 100 and then determines whether to adjust the brightness of the backlight.

Meanwhile, the step S435 shown in FIG. 4A may be optional. In particular, if the temperature of the mobile terminal 100 is not equal to or higher than the predetermined temperature, the step S420 of measuring the temperature of the mobile terminal 100 can be entered without determining whether the SVLTE mode is ended.

The above-mentioned measurement of the temperature of the mobile terminal 100 starts while the SVLTE mode is active. And, this temperature measurement may keep being performed until the SVLTE mode is ended.

As the temperature of the mobile terminal 100 exceed the predetermined temperature, even if the brightness of the backlight is lowered, if the user intends to force the brightness of the backlight or the display unit 151 to be raised, the controller 180 can output a warning signal, for example, for the power consumption and heat generation as a warning message, a warning sound and the like.

In the above-mentioned method described with reference to FIG. 4A, the mobile terminal temperature measuring step may be skipped. In particular, if the mobile terminal 100 enters the SVLTE mode, the controller 180 can adjust the brightness of the backlight. If the SVLTE mode is entered, since a power consumption rate of the mobile terminal increases, the mobile terminal 100 determines whether the SVLTE mode is entered. If the SVLTE mode is entered, the brightness of the backlight may be lowered. Compared to the method shown in FIG. 4A, this method may not need additional hardware and software to monitor the temperature of the mobile terminal 100.

Figure 4B:
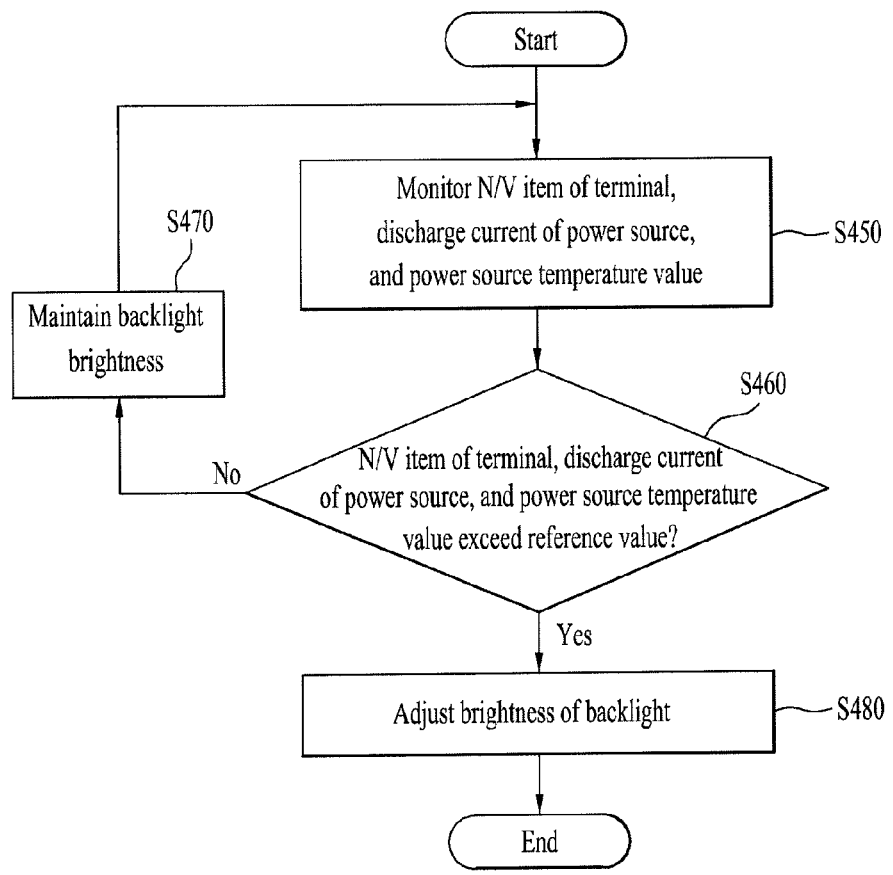

FIG. 4B is a flowchart illustrating another example of a method of controlling a mobile terminal according to an embodiment of the present invention.

Referring to FIG. 4B, the controller 180 monitors N/V (non-volatile) item of the mobile terminal 100, a discharge current of a power source and a power source temperature value (S450). The controller 180 determines whether the N/V item, discharge current and temperature value exceeds a preset reference value (S460). If the reference value is exceeded (Yes in S480), the controller 180 adjusts the brightness of the backlight (S480). If the reference value is not exceeded (No in S460), the controller 180 maintains the brightness of the backlight (S470) and then monitors the N/V item, discharge current and temperature value again.

Instead of the aforesaid LCD brightness adjustment dependent on the temperature of the mobile terminal in FIG. 4A, FIG. 4B shows a case that the backlight brightness is adjusted in accordance with an operating status of the mobile terminal 100. In this instance, using the N/V (non-volatile) item for checking a radio used status of the mobile terminal 100, the controller 180 can check whether the mobile terminal 100 is in a mode of using both of 2G/3G and 4G or the SVLTE mode of using 2G, 3G and 4G simultaneously. Hence, RF Tx/Rx (transmission/reception) power can be obtained from each communication environment. Though the N/V item, the controller 180 can check the wireless status of the mobile terminal 100 and simultaneously monitor the discharge current of the power source and the power source temperature of the mobile terminal 100 (S450). When these values are being simultaneously monitored, if the monitored value exceeds a specific reference value over prescribed duration (Yes in S460), the backlight brightness may be adjusted (S480). In particular, when a surface temperature of the mobile terminal 100 exceeds a specification, N/V item value, discharge current of a power source and power source temperature value can be saved as a table through pre-qualification. Hence, using this table, the controller 180 can adjust the brightness of the backlight. The controller 180 sets a reference value with reference to this table. The controller 180 compares this reference value with the N/V item value, discharge current of a power source and power source temperature value by real time. If a specific conditional value is exceeded, the controller 180 executes the adjustment of the backlight brightness (S480). If the value is not exceeded (No in S460), the controller 180 maintains the backlight brightness (S470).

Meanwhile, in the case shown in FIG. 4A, as the temperature sensing unit of the mobile terminal is activated due to a temperature rise of an external environment, the backlight brightness may be arbitrarily adjustable. Yet, the method shown in FIG. 4B prevents the arbitrary backlight brightness adjustment. And, the method shown in FIG. 4B performs the adjustment of the backlight brightness by monitoring the terminal temperature rise occurring in case of excessive current consumption of Bluetooth headset, terminal AP, WiFi and/or the like.

Namely, the method shown in FIG. 4B monitors a current consumption of another device instead of monitoring whether the SVLTE mode is entered. In order to obtain accurate information, the discharge current of the power source and the battery temperature rise of the power source are checked in real time. Meanwhile, despite the adjustment of the brightness of the backlight of the mobile terminal in FIG. 4A or FIG. 4B, if the temperature of the mobile terminal 100 does not drop, the controller 180 can turn off functions of the rest of devices belonging to the mobile terminal 100 except minimum functions of securing the wireless environment such as 2G, 3G, 4G and the like. In order to turn off the functions of the rest of the devices, a user can select a turn-off function.

The operation of turning off the functions of the rest of the devices may be set by priority. For instance, the brightness adjustment of the backlight or LCD is preferentially applied. In this instance, if the temperature of the mobile terminal is not lowered, a call function may be turned off The rest of the functions are then prioritized to sequentially cut off a current of the corresponding device. A user may be informed of such an operation via the display unit 151. Alternatively, this operation is recognized by a user via audio to get user's consent.

Meanwhile, if the power of the mobile terminal 100 reaches a level equal to or lower than a predetermined level, the controller 180 can lower the brightness of the backlight down to a predetermined value to maintain the corresponding communication environment. In brief, according to an embodiment of the present invention, the controller 180 can adjust the brightness of the backlight in a manner of determining the brightness of the backlight step by step.

After this status has been maintained for a while, if a remaining amount of the battery reaches a level equal to or lower than a prescribed level, the mobile terminal needs to preferentially secure a speech communication environment of the two communication environments. Hence, the mobile terminal notifies a user for the interruption of the 4G communication and then stops operating the 4G communication to maintain the speech communication environment with a minimum amount of the remaining battery.

The scenario for the present invention is described in detail as follows.

First of all, the present invention may be applicable in association with a charging mode in a following manner.

While a user performs netsurfing or uses on-line video, on-line game or the like download or access via 4G communication, if there is an incoming call, a system may enter a mode of simultaneously supporting 4G and 2G/3G communications and the sensing unit 140 may then measure the temperature of the mobile terminal 100. In doing so, if the measured temperature exceeds a specific temperature, the brightness of the display unit 151, on which the netsurfing, the video, the game or the like played by the user is displayed, is lowered in proportion to the lowered brightness of the backlight. Hence, as the brightness of the backlight is lowered, the controller 180 can reduce the heat generation and the power consumption of the mobile terminal 100.

If the mobile terminal uses two communication environments, the current consumption is increased in the SVLTE mode of using 2G/3G and 4G simultaneously or using 2G/3G and LTE simultaneously. Hence, it may be difficult to charge the power source in the SVLTE mode.

For example, when a power charging amount is set to 600 mA, if 300 mA is consumed for a normal CDMA speech in the course of the charging, about 300 mA is available for the power charging. Yet, when the mobile terminal is in the SVLTE mode, if the current consumption takes 700 mA, a used current is greater than a charging current to disable the power charging. If the present invention applies to this example, the backlight current consumption is reduced by 150 mA from 700 mA owing to the lowered brightness of the backlight and an actual current consumption amounts to 550 mA. Hence, about 50 mA may be available for the charging.

After a charging amount has been raised by lowering the brightness of the backlight, the controller 180 can automatically turn off functions of WiFi and BT to raise a charging amount additionally. Hence, the controller 180 can secure a charging current amounting to the reduced current consumption of the WiFi and BT devise. Alternatively, by decreasing an operation clock of AP, the controller 180 can secure a charging current amounting to the reduced current consumption of the AP. In particular, if the rest of the functions except the minimum functions of securing the wireless environments of 2G, 3G, 4G and the like are set to be sequentially turned off, the controller 180 can additionally secure the charging current. Meanwhile, regarding the function turn-off or interruption, if the functions are displayed by priority, a user can select the function(s) to turn off Although a power charging current may be set high, it may cause an effect of high heat generation in the course of a power charging. Hence, it may be preferable to set a charging current to a proper value.

When an earset of a wireless environment is used, the present invention may apply in a following manner.

First of all, when a mobile terminal is used in SVLTE mode, a user may use an earset of a wireless environment such as Bluetooth and the like for a voice service or an audio service instead of a wired earset. In this instance, a power consumption is greater than that of a wired voice service environment. If an earset of a wireless environment such as Bluetooth and the like proceeds in two communication environments, the mobile terminal performs an action of further lowering the brightness by additionally controlling the brightness of the backlight. For instance, when two communication environments are provided in the wired earset environment, if the LCD brightness is automatically lowered to 40%, the brightness in the wireless earset environment may be lowered to 20%.

Meanwhile, when the mobile terminal 100 exists outdoors, the present invention may apply in a following manner.

First of all, if the mobile terminal 100 exists outdoors, the backlight brightness may be automatically raised in accordance with external intensity of illumination. While this operation is proceeding, if two communication environments are used, heat generation and current consumption of the mobile terminal 100 may rapidly increase. In this instance, as mentioned in the foregoing description, the controller 180 can prevent the excessive heat generation due to the rapid current consumption of the mobile terminal 100 by lowering the backlight brightness to a specific level. Accordingly, thermal shutdown can be prevented. Moreover, in order to enable a user to recognize information on the operation of lowering the backlight brightness to prevent the excessive current consumption due to the current two communication modes, an icon or a text may be displayed on the display unit.

When the mobile terminal 100 transceives data with a network, the present invention may apply to a transmitting mode and a receiving mode differently in a following manner.

First of all, when two communication modes are used, in case of such a data service as LTE communication and the like, data transmission of the mobile terminal 100 to the network may consume power greater than that of data reception of the mobile terminal 100 from the network. Hence, in order to prevent the rapid heat generation of the mobile terminal due to the excessive current consumption in case of using the two communication modes, the mobile terminal 100 can perform an automatic brightness adjustment of the backlight in a manner of adjusting the brightness in accordance with a transmitting or receiving status of the mobile terminal 100. For instance, although two communication modes are used, the mobile terminal 100 can transmit specific data to secure a connected state of the network. Hence, in case of the receiving mode, the brightness of the backlight of the mobile terminal 100 may be set not to be lowered. Yet, if the transmitting mode proceeds in the mobile terminal over predetermined duration (e.g., upload of large-sale data, real-time video taking, etc.), an operation of lowering the brightness of the backlight may be performed.

Yet, for the receiving mode, when a user stays at a dead spot, since power consumption considerably increases on performing an operation to secure continuity of the network, if the sensing unit 140 built in the mobile terminal 100 senses that a temperature is equal to or higher than a predetermined temperature, the controller 180 can perform an operation of lowering the brightness of the backlight.

In the following description, backlight brightness adjustment according to an embodiment of the present invention is explained with reference to FIGS. 5 to 8.

Figure 5:
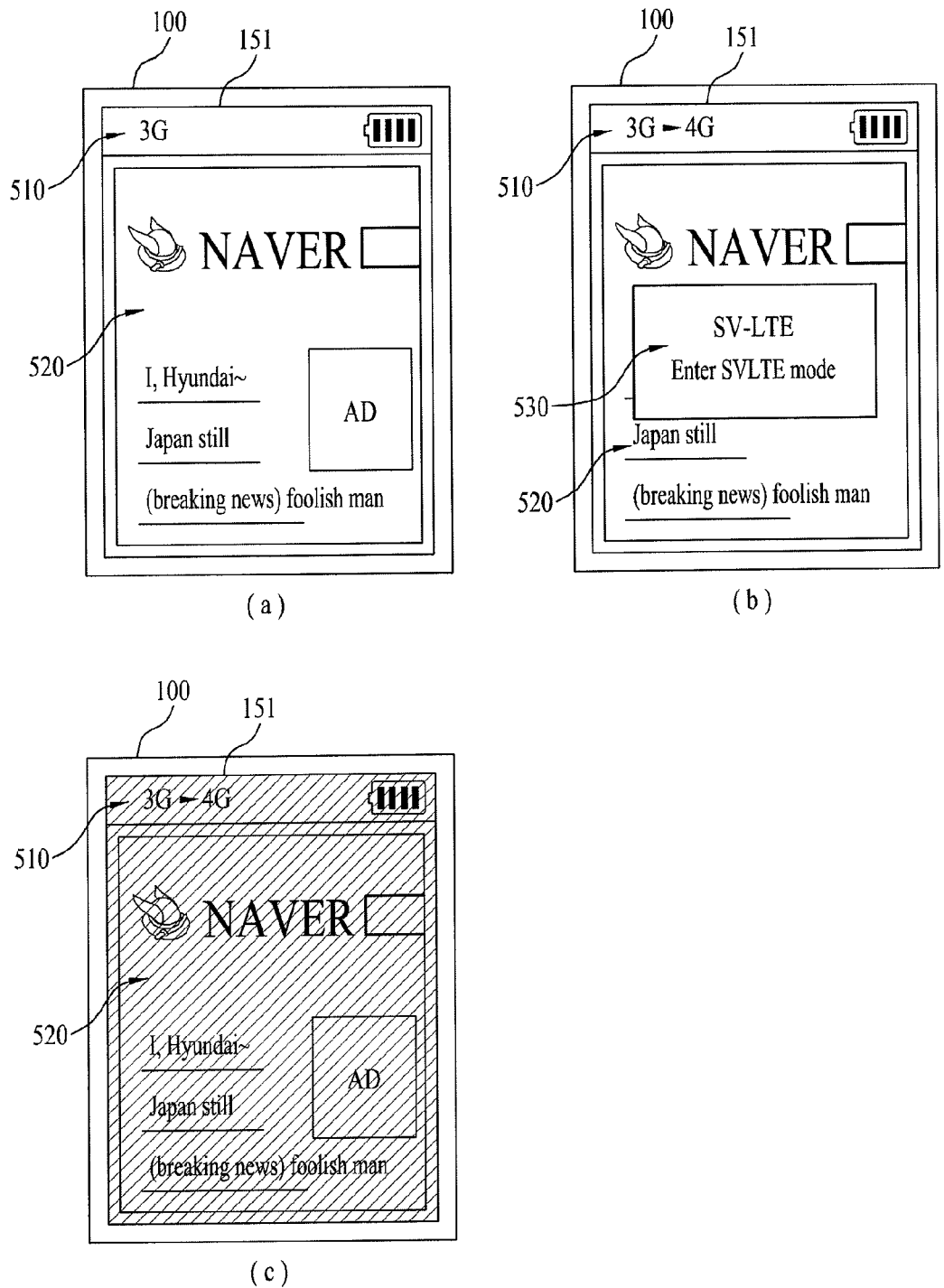
FIG. 5 is a diagram illustrating an operation of adjusting brightness of a backlight in case of entering SV-LTE mode according to an embodiment of the present invention.

FIG. 5 is a diagram illustrating an operation of adjusting a brightness of a backlight when entering the SVLTE mode according to an embodiment of the present invention.

Referring to FIG. 5, if SVLTE mode is entered, the brightness of the backlight is adjusted irrespective of temperature measurement.

Referring to FIG. 5(a), the display unit 151 displays an activated screen 520 of a specific application. In particular, an internet application is shown as the specific application. A communication environment is displayed on a top end portion 510 of the display unit 151. The display unit 151 indicates 3G mode before entering SVLTE mode.

Referring to FIG. 5(b), the mobile terminal 100 enters the SVLTE mode of using 3G and 4G simultaneously. The display unit 151 can display that the SVLTE mode is entered using an indication window 530. If the controller 180 determines that the SVLTE mode has been entered, the controller 180 can adjust brightness of the backlight.

Referring to FIG. 5(c), the brightness of the display unit 151 of the mobile terminal 100 is adjusted. Under the control of the controller 180, the brightness of the backlight is lowered to a level equal to or lower than a specific level. Through this, the mobile terminal 100 having entered the SVLTE mode can reduce power consumption and heat generation rate in accordance with the lowered brightness of the backlight.

Figure 6:
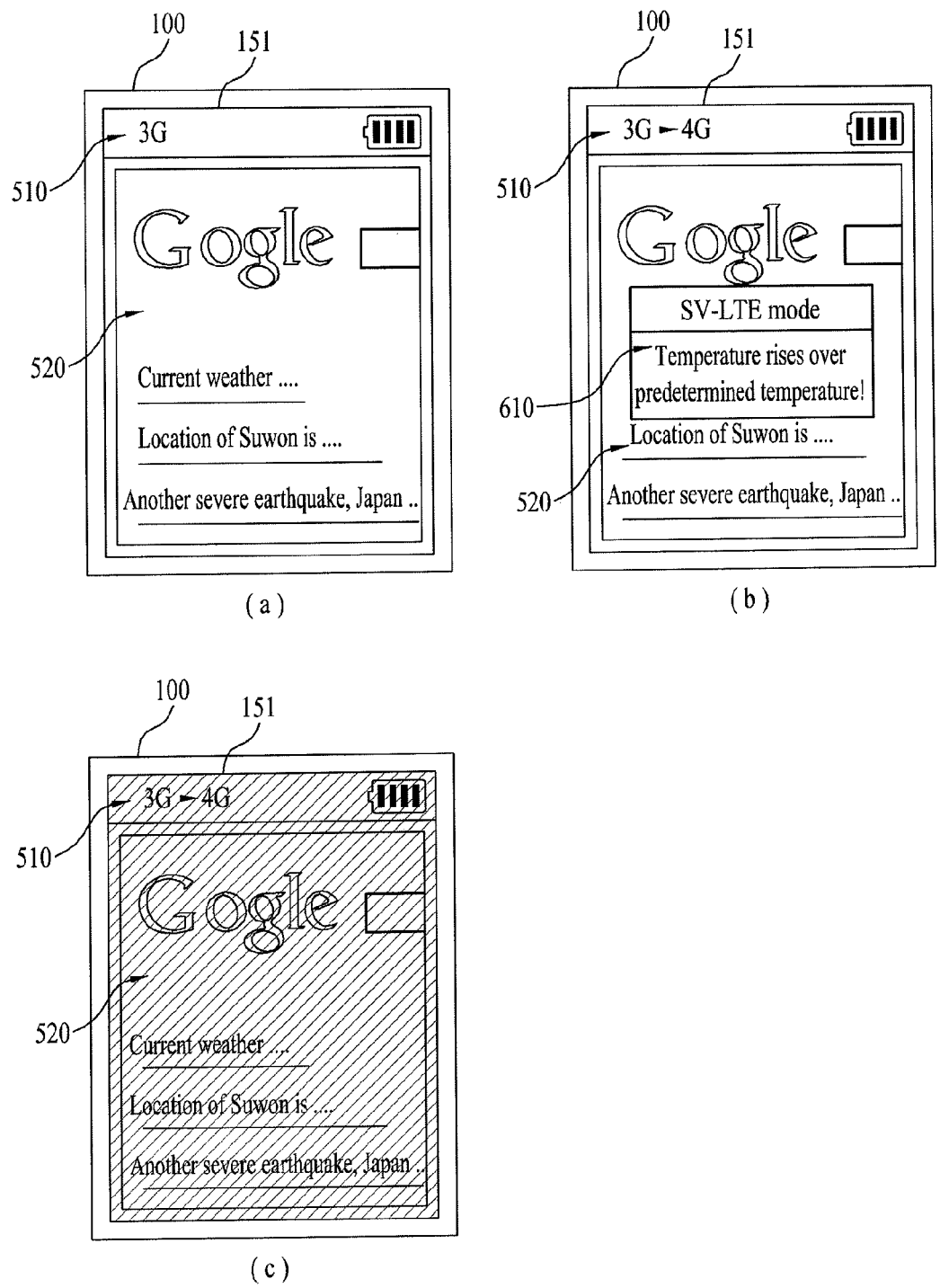
FIG. 6 is a diagram illustrating an operation of adjusting brightness of a backlight in case of temperature climb according to an embodiment of the present invention.

Next, FIG. 6 is a diagram for an operation of adjusting a brightness of a backlight in case of temperature climbing to an embodiment of the present invention.

Referring to FIG. 6(a), the display unit 151 displays an activated screen 520 of a specific application. In particular, an internet application is shown as the specific application. A communication environment is displayed on a top end portion 510 of the display unit 151.

Referring to FIG. 6(b), the mobile terminal 100 enters the SVLTE mode of using 3G and 4G simultaneously. Subsequently, the sensing unit 140 of the mobile terminal 100 measures a temperature of the mobile terminal 100. As a result of the temperature measurement, if the measured temperature reaches a temperature equal to or higher than a predetermined temperature, the controller 180 can indicate that the measured temperature is equal to or higher than the predetermined temperature using the display unit 151. Hence, the display unit 151 displays an indication window 610 indicating that the measured temperature is equal to or higher than the predetermined temperature.

Referring to FIG. 6(c), the brightness of the display unit 151 of the mobile terminal 100 is adjusted. Under the control of the controller 180, the brightness of the backlight configuring the display unit 151 is lowered to a level equal to or lower than a specific level. Compared to FIG. 6(a), FIG. 6(c) shows that the brightness of the display unit 151 is lowered. Through this, if the temperature rises over a predetermined level, the mobile terminal 100 lowers the brightness of the backlight to prevent excessive power consumption and heat generation.

Figure 7A:
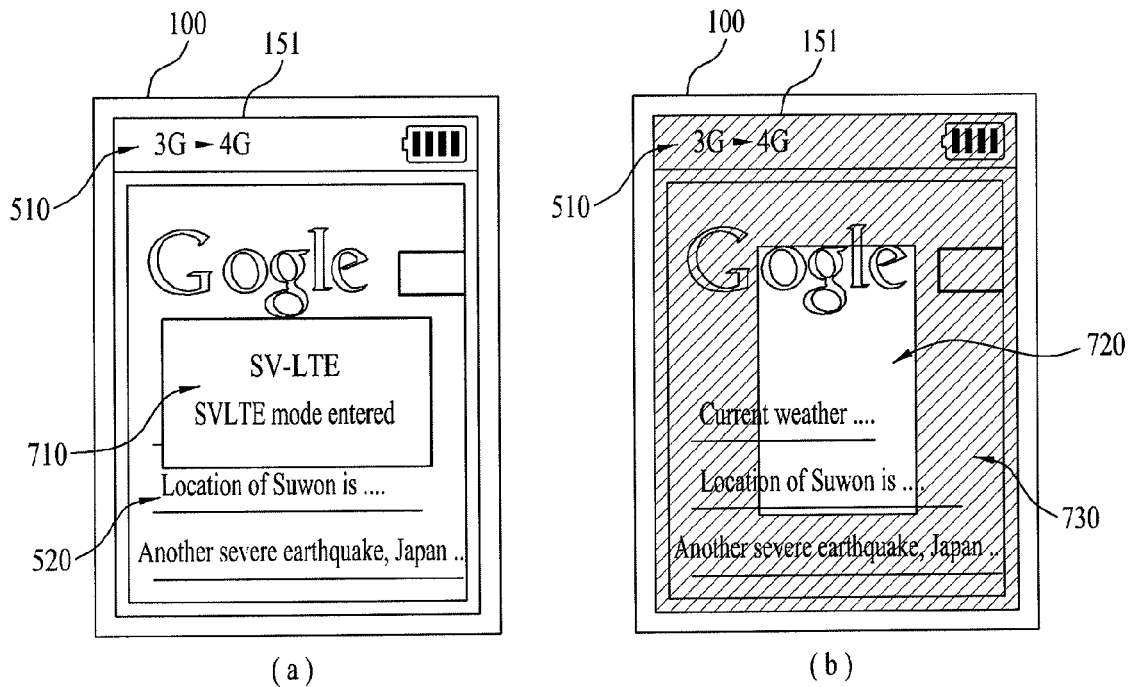
FIG. 7A and FIG. 7B are diagrams illustrating various examples of brightness adjustment of a backlight according to an embodiment of the present invention.
Figure 7B:
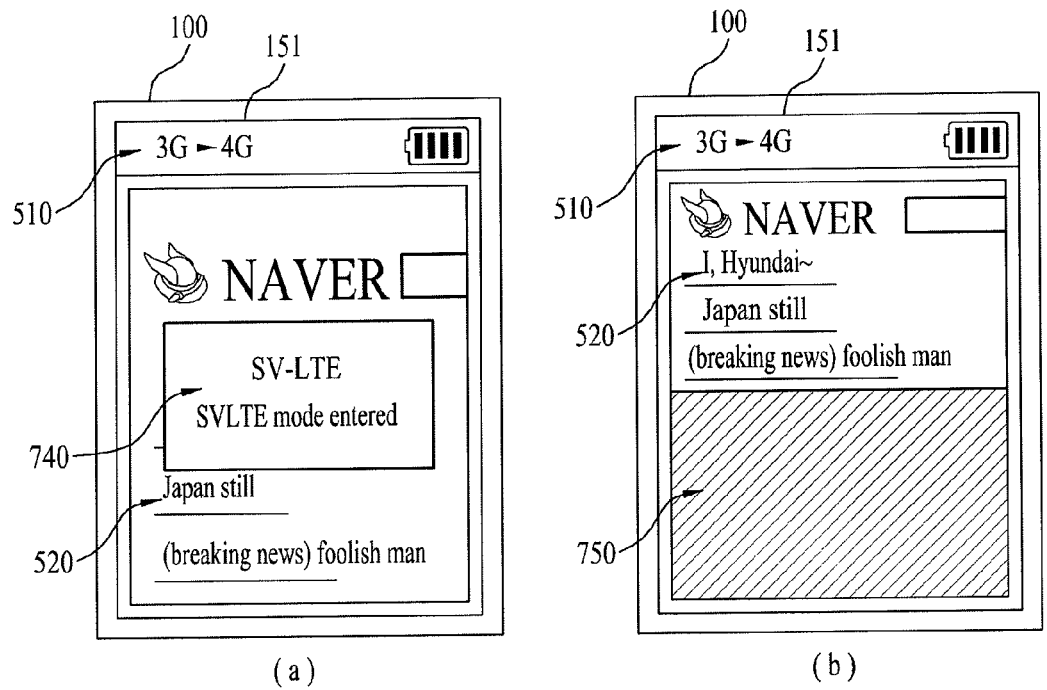

FIG. 7A and FIG. 7B are diagrams for various examples of brightness adjustment of a backlight according to an embodiment of the present invention.

Regarding the brightness adjustment of the backlight according to an embodiment of the present invention, the brightness of the backlight of the display unit 151 may be adjusted in various ways. For instance, if SVLTE mode is entered or a temperature reaches a specific temperature or higher, the brightness of the backlight of a display specific region can be adjusted.

FIG. 7A shows one example of adjusting the brightness of the backlight.

Referring to FIG. 7A(a), after the mobile terminal 100 has entered SVLTE mode, a temperature of the mobile terminal 100 rises to a specific temperature. After the SVLTE mode has been entered, the controller 180 can check whether the temperature determined by the sensing unit 140 is equal to or higher than the specific temperature. The display unit 151 may display an indication window 710 to indicate that the temperature of the mobile terminal 100 has risen to the specific temperature or higher.

FIG. 7A(b) shows one example of adjusting the brightness of the backlight. In particular, FIG. 7A(b) shows that the brightness of the backlight corresponding to a specific region of the display unit 151 is adjusted only.

In order to adjust the brightness of the backlight, it may be unnecessary to indiscriminately adjust a brightness of a whole backlight. By means of reducing power in adjusting the brightness of the backlight, the controller 180 can adjust the brightness of the backlight of the specific region only. Hence, if the temperature of the mobile terminal 100 reaches the specific temperature or higher after entering the SVLTE mode, the brightness of the backlight may be lowered in part instead of lowering the brightness of the whole backlight uniformly. Referring to FIG. 7A(b), although the display unit 151 displays a specific application 520 in the same manner shown in FIG. 7A(a), the brightness of the backlight of a specific region 730 is adjusted only instead of lowering the brightness of all regions of the backlight while the brightness of the rest region 720 of the backlight is maintained intact.

FIG. 7B shows another example of adjusting the brightness of the backlight.

Referring to FIG. 7B(a), after the mobile terminal 100 has entered SVLTE mode, a temperature of the mobile terminal 100 rises to a specific temperature. A display window 710 can indicate the SVLTE mode has been entered and the temperature has risen over a predetermined temperature.

In particular, FIG. 7B(b) shows that a screen region of the display unit 151 is reduced.

In FIG. 7A, while the screen region for displaying a content is maintained as it is, the region for lowering the brightness of the backlight is adjusted. Unlike FIG. 7A, FIG. 7B(b) shows that the screen region for displaying the content can be reduced. In particular, the screen region of the display unit 151 is reduced and the content may be displayed on the reduced screen region 520. In a region 750 except the reduced screen region, the brightness of the backlight may be lowered or eliminated under the control of the controller 180. Through this, the power of the backlight may be decreased, whereby the temperature and power of the mobile terminal 100 can be reduced.

Figure 8:
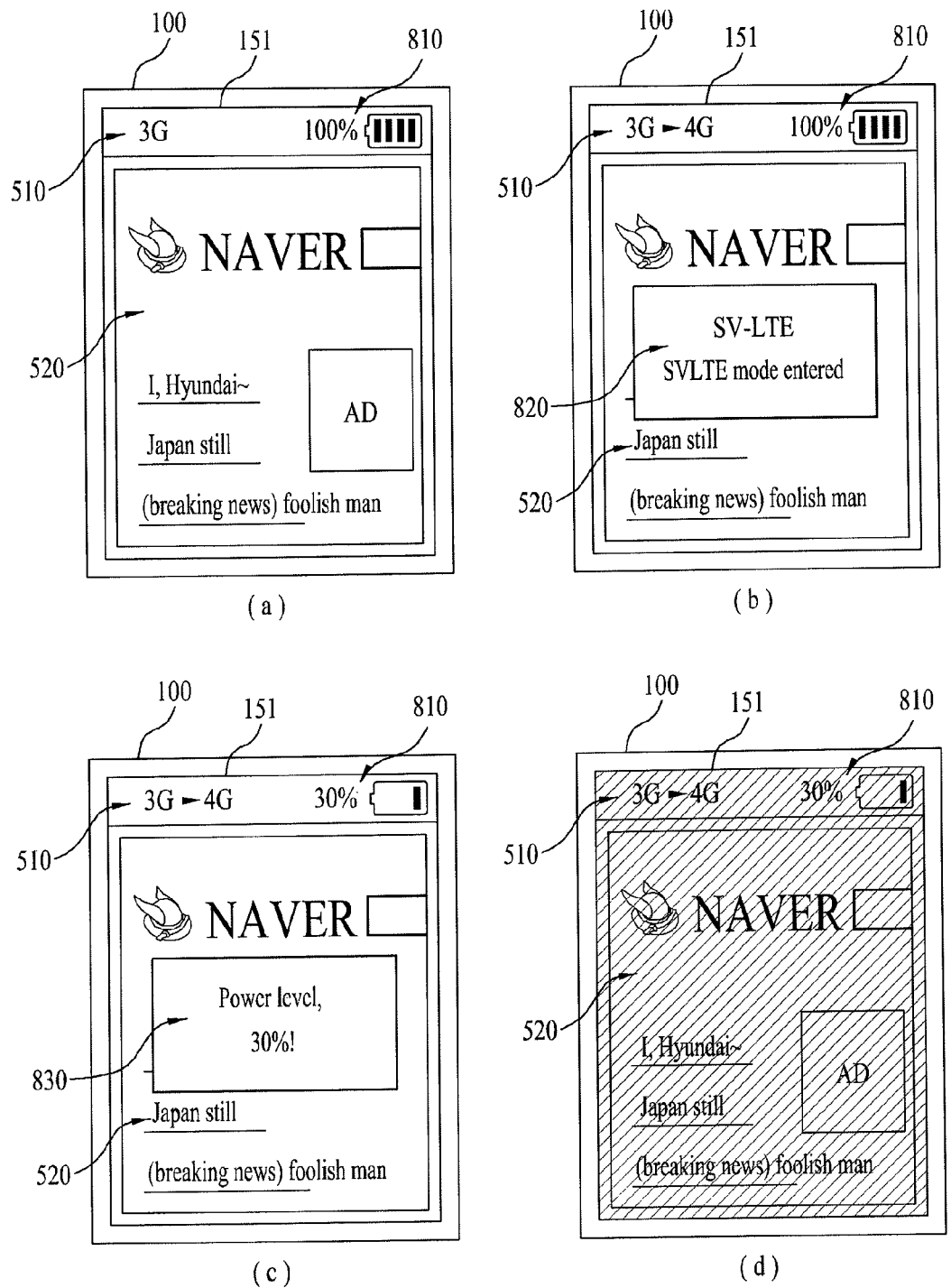
FIG. 8 is a diagram illustrating an operation of adjusting brightness of a backlight for a terminal power status according to an embodiment of the present invention.

FIG. 8 is a diagram for an operation of adjusting brightness of a backlight for a terminal power status according to an embodiment of the present invention.

According to another embodiment of the present invention, the brightness of the backlight may be adjusted in accordance with a power level of the mobile terminal 100.

Referring to FIG. 8(*a*), the display unit 151 displays a specific application before SVLTE mode is entered. The display unit 151 displays an activated operation of an internet application as the specific application.

Referring to FIG. 8(*b*), the mobile terminal 100 has entered the SVLTE mode. The display unit 151 displays an indication window 820 to indicate that the SVLTE mode has been entered.

Referring to FIG. 8(*c*), unlike FIG. 8(*b*), a power level is lowered to 30% from 100%. After the mobile terminal 100 of the present invention 100 has entered the SVLTE mode, if the power level is lowered to a predetermined level or lower, the brightness of the backlight can be adjusted. In FIG. 8(*c*), the display unit 151 displays an indication window 820 to indicate that the lower level is lowered to the predetermined level or lower.

If the SVLTE mode is entered, power consumption may considerably increase. Hence, if the power level is lowered to the predetermined level or lower, the present invention can adjust a power-decreasing rate by lowering the brightness of the backlight.

Referring to FIG. 8(*d*), if the power level is lowered to the predetermined level or lower, the brightness of the backlight is adjusted.

Meanwhile, although the brightness of the backlight is adjusted in accordance with the power level in the description with reference to FIG. 8, the controller 180 can adjust the brightness of the backlight in consideration of the power level and temperature of the mobile terminal both.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The above-described mobile terminal may be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention may provide the following effects and/or advantages.

First of all, a mobile terminal according to at least one embodiment of the present invention applies communications schemes of various generations simultaneously.

Secondly, a mobile terminal according to at least one embodiment of the present invention reduces power consumption and heat generation rate in case of using both 3G and 4G systems.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate using at least two different communication systems;
a display unit including a backlight configured to apply light to a display screen of the display unit;
a sensing unit configured to measure a temperature of the mobile terminal if the at least two different communication systems are simultaneously used; and
a controller configured to:
adjust a brightness of the backlight when the measured temperature is equal to or higher than the preset temperature and the wireless communication unit switches from using a single communication system to using the at least two different communication systems,
lower the brightness of the backlight by reducing the light of a first region of the display screen while maintaining the brightness of the backlight applying to a second region of the display screen, and
adjust at least a size or arrangement of content displayed on the display unit corresponding to the second region of the display screen,
wherein the sensing unit measures the temperature only when the at least two different communication systems are simultaneously used.

2. The mobile terminal of claim 1, wherein the at least two communication systems comprise at least two selected from the group consisting of a $2^{nd}$ generation mobile communication system, a $3^{rd}$ generation mobile communication system and a $4^{th}$ generation mobile communication system.

3. The mobile terminal of claim 1, wherein the controller is further configured to lower the brightness of the backlight step by step in accordance with the measured temperature.

4. The mobile terminal of claim 1, wherein the controller is further configured to determine if the simultaneous use of the at least two communication systems has ended, and to restore the brightness of the backlight when the simultaneous use has ended.

5. The mobile terminal of claim 1, wherein the sensing unit is further configured to periodically measure the temperature of the mobile terminal.

6. The mobile terminal of claim 1, wherein the controller is further configured to check a power level of the mobile terminal and to adjust the brightness of the backlight based on the power level of the mobile terminal.

7. The mobile terminal of claim 1, wherein the controller is further configured to control the sensing unit to periodically measure the temperature of the mobile terminal after the brightness of the backlight has been adjusted.

8. The mobile terminal of claim 7, wherein after the brightness of the backlight has been adjusted, and if the temperature of the mobile terminal rises, the controller stops executing at least one function of the mobile terminal in a prioritized manner.

9. The mobile terminal of claim 7, wherein after the brightness of the backlight has been adjusted, and if the temperature of the mobile terminal rises, the controller stops executing at least one function of the mobile terminal based on a user command.

10. A method of controlling a mobile terminal, the method comprising:

allowing wireless communication, via a wireless communication unit of the mobile terminal, wireless communication using at least two different communication systems;
displaying, via a backlight applying light to a display screen of a display unit of the mobile terminal, information;
measuring, via a sensing unit of the mobile terminal, a temperature of the mobile terminal if the at least two different communication systems are simultaneously used; and
adjusting, via a controller of the mobile terminal, a brightness of the backlight when the measured temperature is equal to or higher than at the present temperature and the wireless communication unit switches from using a single communication system to using the at least two different communication systems,
wherein the step of adjusting the brightness of the backlight comprises:
reducing the light of a first region of the display screen while maintaining the brightness of the backlight applying to a second region of the display screen; and
adjusting at least a size or arrangement of content displayed on the display unit corresponding to the second region of the display screen, and
wherein the sensing unit measures the temperature only when the at least two different communication systems are simultaneously used.

11. The method of claim 10, wherein the at least two communication systems comprise at least two selected from the group consisting of a $2^{nd}$ generation mobile communication system, a $3^{rd}$ generation mobile communication system and a $4^{th}$ generation mobile communication system.

12. The method of claim 10, wherein the adjusting step comprises: lowering the brightness of the backlight step by step in accordance with the measured temperature.

13. The method of claim 10, further comprising: determining if the simultaneous use of the at least two communication systems has ended; and restoring the brightness of the backlight when the simultaneous use has ended.

14. The method of claim 10, wherein the sensing step periodically measures the temperature of the mobile terminal.

15. The method of claim 10, further comprising: checking a power level of the mobile terminal; and adjusting the brightness of the backlight based on the power level of the mobile terminal.

16. The method of claim 10, wherein the measuring step comprises: periodically measuring the temperature of the mobile terminal after the brightness of the backlight has been adjusted.

17. The method of claim 16, wherein after the brightness of the backlight has been adjusted, and if the temperature of the mobile terminal rises, the method further comprises: stopping execution of at least one function of the mobile terminal in a prioritized manner.

18. The method of claim 16, wherein after the brightness of the backlight has been adjusted, and if the temperature of the mobile terminal rises, the method further comprises: stopping execution of at least one function of the mobile terminal based on a user command.

* * * * *